United States Patent
Magee et al.

(10) Patent No.: US 11,106,030 B2
(45) Date of Patent: Aug. 31, 2021

(54) OPTICAL DISTANCE MEASUREMENT SYSTEM USING SOLID STATE BEAM STEERING

(71) Applicant: TEXAS INSTRUMENTS INCORPORATED, Dallas, TX (US)

(72) Inventors: David P. Magee, Allen, TX (US); Nirmal C. Warke, Saratoga, CA (US); Stephen Aldridge Shaw, Plano, TX (US); Terry Alan Bartlett, Dallas, TX (US); Rick Oden, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 374 days.

(21) Appl. No.: 15/592,884

(22) Filed: May 11, 2017

(65) Prior Publication Data
US 2017/0328988 A1  Nov. 16, 2017

Related U.S. Application Data

(60) Provisional application No. 62/334,713, filed on May 11, 2016.

(51) Int. Cl.
| | |
|---|---|
| *G02B 26/08* | (2006.01) |
| *G01S 7/484* | (2006.01) |
| *G01S 17/10* | (2020.01) |
| *G01S 7/481* | (2006.01) |

(52) U.S. Cl.
CPC .......... *G02B 26/0833* (2013.01); *G01S 7/484* (2013.01); *G01S 7/4815* (2013.01); *G01S 7/4817* (2013.01); *G01S 17/10* (2013.01)

(58) Field of Classification Search
CPC ...... G01S 17/89; G01S 7/4817; G01S 17/023; G01S 17/936
See application file for complete search history.

(56) References Cited

U.S. PATENT DOCUMENTS

| | | |
|---|---|---|
| 6,086,539 A | 7/2000 | Guracar et al. |
| 2005/0057741 A1 | 3/2005 | Anderson et al. |
| 2007/0097381 A1 | 5/2007 | Tobiason et al. |
| 2008/0166024 A1 | 7/2008 | Iketani |

(Continued)

OTHER PUBLICATIONS

Beger, R., et al., "Data Fusion of Extremely High Resolution Aerial Imagery and LiDAR Data for Automated Railroad Centre Line Reconstruction," ISPRS Journal of Photogrammetry and Remote Sensing, vol. 66, 2011, pp. 40-51.

(Continued)

*Primary Examiner* — Luke D Ratcliffe
(74) *Attorney, Agent, or Firm* — Michelle F. Murray; Charles A. Brill; Frank D. Cimino

(57) ABSTRACT

An optical distance measuring system includes a first transmitter, a first solid state device, and a receiver. The first transmitter is configured to generate a first optical waveform. The first solid state device is configured to receive the first optical waveform and steer the first optical waveform toward a target object. The receiver is configured to receive the first optical waveform reflected off of the first target object and determine a distance to the first target object based on a time of flight from the transmitter to the first target object and back to the receiver.

22 Claims, 3 Drawing Sheets

(56) References Cited

U.S. PATENT DOCUMENTS

| | | | |
|---|---|---|---|
| 2012/0069342 A1* | 3/2012 | Dalgleish | G01N 21/47 356/445 |
| 2013/0127854 A1 | 5/2013 | Shpunt et al. | |
| 2013/0207970 A1 | 8/2013 | Shpunt et al. | |
| 2015/0378011 A1 | 12/2015 | Owechko | |
| 2015/0378023 A1 | 12/2015 | Royo Royo et al. | |
| 2016/0209498 A1* | 7/2016 | Kanter | G01S 17/10 |
| 2016/0223667 A1 | 8/2016 | Schiessl et al. | |
| 2016/0245919 A1 | 8/2016 | Kalscheur et al. | |
| 2016/0282468 A1 | 9/2016 | Gruver | |
| 2017/0024877 A1 | 1/2017 | Versace et al. | |
| 2017/0031363 A1 | 2/2017 | Laur et al. | |
| 2017/0115387 A1 | 4/2017 | Luders et al. | |
| 2017/0176579 A1* | 6/2017 | Niclass | G01S 17/42 |
| 2017/0235429 A1* | 8/2017 | Viswanathan | G06F 3/017 345/175 |
| 2017/0242125 A1* | 8/2017 | Suzuki | G01S 17/08 |
| 2018/0267556 A1 | 9/2018 | Templeton et al. | |
| 2018/0364356 A1* | 12/2018 | Eichenholz | H01S 5/4087 |
| 2019/0107711 A1 | 4/2019 | Blanche et al. | |
| 2019/0196579 A1* | 6/2019 | Shpunt | G01S 7/4817 |

OTHER PUBLICATIONS

Teo, T., et al. "Pole-Like Road Object Detection From Mobile Lidar System Using a Coarse-to-Fine Approach," IEEE Journal of Selected Topics in Applied Earth Observations and Remote Sensing, vol. 8, No. 10, Oct. 2015, pp. 4805-4818.

Final Office Action dated Sep. 4, 2020, U.S. Appl. No. 15/592,921, filed May 11, 2017, 18 pages.

\* cited by examiner

OPTICAL DISTANCE MEASUREMENT SYSTEM USING SOLID STATE BEAM STEERING

CROSS-REFERENCE TO RELATED APPLICATIONS

The present application claims priority to U.S. Provisional Patent Application No. 62/334,713, filed May 11, 2016, titled "3D Distance Measurements Using Micromirror Beam Steering And Orthogonal Light Waveforms," which is hereby incorporated herein by reference in its entirety.

BACKGROUND

Light Detection And Ranging (LiDAR, LIDAR, lidar, LADAR) is a system that measures the distance to a target object by reflecting a laser pulse sequence (a single narrow pulse or sequence of modulated narrow pulses) off of the target and analyzing the reflected light. More specifically, LiDAR systems typically determine a time of flight (TOF) for the laser pulse to travel from the laser to the target object and return either directly or by analyzing the phase shift between the reflected light signal and the transmitted light signal. The distance to the target object then may be determined based on the TOF. These systems may be used in many applications including: geography, geology, geomorphology, seismology, transport, and remote sensing. For example, in transportation, automobiles may include LiDAR systems to monitor the distance between the vehicle and other objects (e.g., another vehicle). The vehicle may utilize the distance determined by the LiDAR system to, for example, determine whether the other object, such as another vehicle, is too close, and automatically apply braking.

Many LiDAR systems use a rotating optical measurement system to determine distance information for objects in its field of view (FOV). The intensity of the reflected light is measured for several vertical planes through a full 360 degree rotation. However, these systems have limited angular and vertical resolution and require several watts of power to rotate the system.

SUMMARY

In accordance with at least one embodiment of the disclosure, an optical distance measuring system includes a first transmitter, a first solid state device, and a receiver. The first transmitter is configured to generate a first optical waveform. The first solid state device is configured to receive the first optical waveform and steer the first optical waveform toward a target object. The receiver is configured to receive the first optical waveform reflected off of the first target object and determine a distance to the first target object based on a time of flight from the transmitter to the first target object and back to the receiver.

Another illustrative embodiment is an optical transmitting system for optical distance measuring that includes a signal generator, a laser diode coupled to the signal generator, and a solid state device. The signal generator is configured to generate a pulse sequence. The laser diode is configured to generate an optical waveform that corresponds with the pulse sequence. The solid state device is configured to receive the optical waveform and steer the optical waveform toward a target object.

Yet another illustrative embodiment is a method for determining a distance to a target object. The method includes generating a first optical waveform. The method also includes focusing the first optical waveform on a solid state device. The method also includes steering, by the solid state device, the first optical waveform to a first target object. The method also includes receiving the first optical waveform reflected off of the first target object. The method also includes determining a distance to the first target object based on a time of flight of the first optical waveform.

BRIEF DESCRIPTION OF THE DRAWINGS

For a detailed description of various examples, reference will now be made to the accompanying drawings in which.

NOTATION AND NOMENCLATURE

Figure 1:
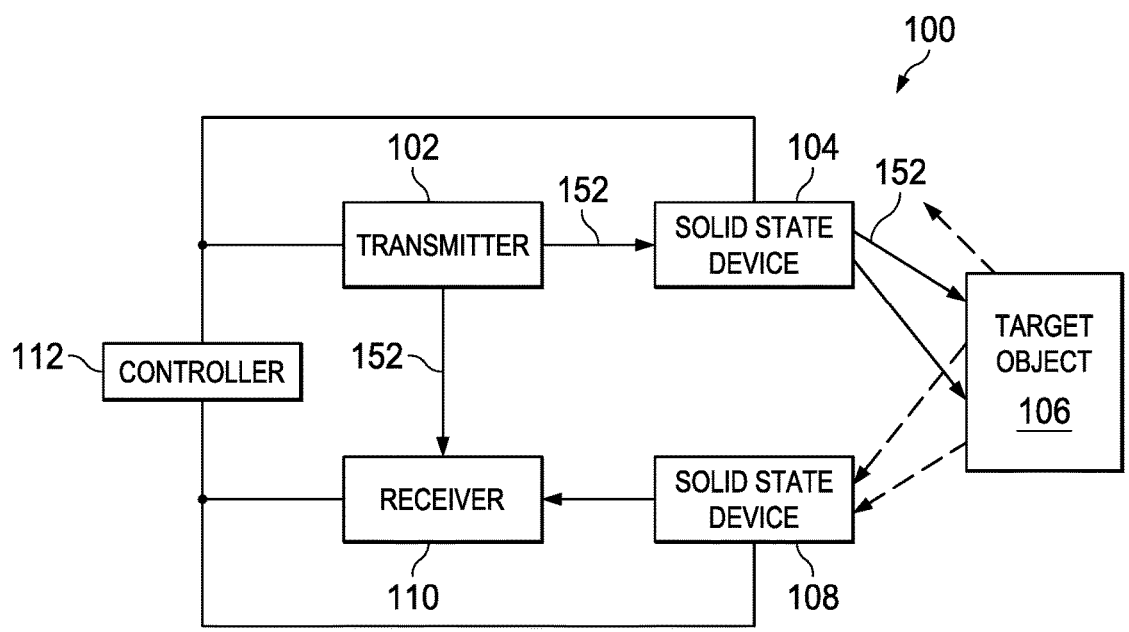
FIG. 1 shows an illustrative distance measuring system in accordance with various examples.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Optical distance measurement systems, such as LiDAR systems, may determine distances to various target objects utilizing the time of flight (TOF) of an optical signal (i.e., a light signal) to the target object and its reflection off a target object back to the LiDAR system (return signal). These systems may be used in many applications including: geography, geology, geomorphology, seismology, transport, and remote sensing. For example, in transportation, automobiles may include LiDAR systems to monitor the distance between the vehicle and other objects (e.g., another vehicle). The vehicle may utilize the distance determined by the LiDAR system to, for example, determine whether the other object, such as another vehicle, is too close, and automatically apply braking.

As discussed above, many conventional LiDAR systems use a rotating optical measurement system to determine distance information for objects in its FOV. The intensity of the reflected light is measured for several vertical planes through a full 360 degree rotation. For example, these conventional LiDAR systems may use a rotating set of transmit and receive optics. For each scan plane, a light beam is transmitted and received at each angular position of the rotating system. When complete, a three dimensional (3D) image of the FOV may be generated. However, these systems have limited angular and vertical resolution and require several watts of power to rotate the system. Therefore, there is a need to develop an optical distance measurement system that increases angular and vertical resolution while reducing power requirements.

In accordance with various examples, a distance measuring system is provided in which a solid state device (e.g., a micromirror device, a phased array device, etc.) is configured to steer optical waveforms within the FOV. Because a solid state device is used to steer the optical beams, the system, unlike conventional distance measuring systems, does not require a motor to rotate the system. Thus, power requirements of the system are reduced. Additionally, in an embodiment, multiple orthogonal optical waveforms may be simultaneously steered by the solid state device, each to different locations and/or target objects within the FOV. Thus, the scan rate and the accuracy of the distance measurements are increased.

FIG. 1 shows an illustrative distance measuring system 100 in accordance with various examples. The distance measuring system 100 includes a transmitter 102, solid state devices 104 and 108, receiver 110, and controller 112. The transmitter 102 is configured to generate an optical waveform 152 by the controller 112. In some embodiments, the optical waveform 152 is a single tone (e.g., a continuous wave), a single tone with phase modulation (e.g., phase shift keying), multiple tones with fixed frequencies (e.g., frequency shift keying), a signal with frequency modulation over a frequency range (e.g., a chirp), and/or a signal with narrowband, pulse position modulation.

The solid state device 104 is configured to receive the optical waveform 152 and steer the optical waveform toward target object 106. In some embodiments, the solid state device 104 is a single chip micromirror device (e.g., a digital micromirror device). In the micromirror device embodiments, the solid state device 104 has a surface that includes thousands, tens of thousands, hundreds of thousands, millions, etc. microscopic mirrors arranged in an array (e.g., a rectangular array). Each of the mirrors on the solid state device 104 are capable of rotation, in some embodiments, by plus or minus 10 to 12 degrees. In other embodiments, the mirrors of the solid state device 104 may be rotated by more or less than plus or minus 10 to 12 degrees. In some embodiments, one or more electrodes (e.g., two pairs) control the position (e.g., the amount of rotation) of each mirror by electrostatic attraction. To rotate the mirrors on the solid state device 104, the required state for each mirror is loaded into a static random-access memory (SRAM) cell that is located beneath each mirror. The SRAM cell is connected to the electrodes that control the rotation of a particular mirror. The charges in the SRAM cells then move each mirror to the desired position. Controller 112 is configured to provide each SRAM cell with the required charge, and thus, controls the position of each mirror in the solid state device 104. Based on the position of each mirror, the solid state device 104 directs the reflected light to form an optical waveform 152 (e.g., optical beam of light) that can be steered to a desired location within the FOV of the system 100. In other words, the mirrors may be positioned to create diffraction patterns causing the beam to steer in two dimensions to a desired location within the FOV. If the desired location is target object 106, the solid state device 104 steers the optical waveform 152 toward target object 106. While some power is required to rotate the mirrors, the power required to rotate these micromirrors is much less than the power required in conventional systems to rotate the entire set of optics within the distance measuring system.

In other embodiments, the solid state device 104 is a phased array device using temperature to steer the optical waveform 152. In these phased array device embodiments, the controller 112 controls the temperature of each of a number of wave guides of the solid state device 104. The wave guides provide optical paths to form the optical waveform 152. By controlling the temperature of the specific wave guides, each path may be phase delayed. This design enables the solid state device 104 to steer the optical waveform 152 in two dimensions to the target object 106.

In other embodiments, the solid state device 104 is a phased array device using position to steer the optical waveform 152. In these phased array device embodiments, the controller 112 controls the linear or angular position of a number of reflective surfaces of the solid state device 104. The reflective surfaces provide optical paths to form the optical waveform 152. By controlling the length and/or orientation of the optical paths, each path may be phase delayed. This design enables the solid state device 104 to steer the optical waveform 152 in two dimensions to the target object 106. In further embodiments, the solid state device 104 may be any solid state device that is capable of steering optical waveform 152.

The optical waveform 152 reflects off of the target object 106. The reflected optical waveform 152 is then received by the solid state device 108, and in a similar manner to solid state device 104, steered to the receiver 110. Like the solid state device 104, the solid state device 108 receives control instructions from controller 112 to configure the solid state device 108 such that the reflected optical waveform 152 is steered to the receiver 110. In alternative embodiments, a single solid state device 104 may be utilized to both steer the optical waveform 152 to the target object and to steer the reflected optical waveform 152 to the receiver 110. Additionally, in some embodiments, the receiver 110 receives the reflected optical waveform 152 directly from the target object 106.

The receiver 110 is configured to receive the reflected optical waveform 152 and determine the distance to the target object 106 based on the TOF from the transmitter 102 to the target object 106 and back to the receiver 110. For example, the speed of light is known, so the distance to the target object 106 is determined and/or estimated using the TOF. That is, the distance is estimated as $$d = \frac{c * TOF}{2}$$

where d is the distance to the target object, c is the speed of light, and TOF is the time of flight. The speed of light times the TOF is halved to account for the travel of the light pulse to, and from, the target object 106. In some embodiments, the receiver 110, in addition to receiving the reflected optical waveform 152 reflected off of the target object 106, is also configured to receive the optical waveform 152, or a portion of the optical waveform 152, directly from the transmitter 102. The receiver 110, in an embodiment, is configured to convert the two optical signals into electrical signals, a received signal corresponding to the reflected optical waveform 152 and a reference signal corresponding to the optical waveform 152 received directly from the transmitter 102. The receiver 110 then, in an embodiment, performs a correlation function using the reference signal and the received signal. A peak in the correlation function corresponds to the time delay of the received reflected optical waveform 152 (i.e., the TOF). The distance then can be estimated using the formula discussed above. In other embodiments, a fast Fourier transform (FFT) can be performed on the received signal. A phase of the tone then is used to estimate the delay (i.e., TOF) in the received signal. The distance then can be estimated using the formula discussed above.

Figure 2:
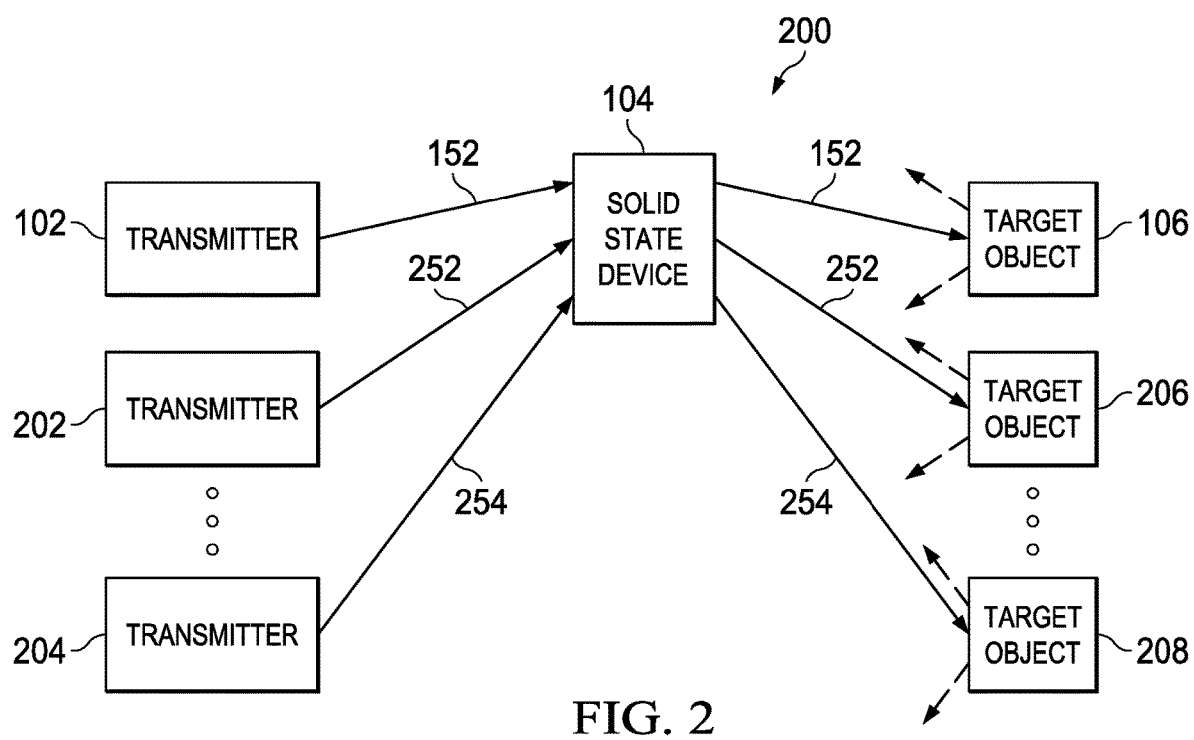
FIG. 2 shows an illustrative distance measuring system in accordance with various examples.

FIG. 2 shows an illustrative distance measuring system 200 in accordance with various examples. The distance measuring system 200 includes transmitters 102, 202, and 204, solid state device 104, and target objects 106, 206, and 208. The ellipsis between the transmitters 202 and 204 indicates that there may be any number of transmitters, although, for clarity, only three are shown. Similarly, the ellipses between the target objects 206 and 208 indicates that there may be any number of target objects, although, for clarity, only three are shown. Transmitters 202-204 are, in an embodiment, similar to transmitter 102. For example, transmitter 202 is configured to generate an optical waveform 252, and transmitter 204 is configured is configured to generate optical waveform 254. In some embodiments, the optical waveforms 252 and 254 are a single tone (e.g., a continuous wave), a single tone with phase modulation (e.g., phase shift keying), multiple tones with fixed frequencies (e.g., frequency shift keying), a signal with frequency modulation over a frequency range (e.g., a chirp), and/or a signal with narrowband, pulse position modulation. In some embodiments, optical waveform 152 has a different wavelength than the optical waveforms 252 and/or 254. Similarly, the optical waveform 252, in an embodiment, has a different wavelength than the optical waveforms 152 and/or 254. Thus, the optical waveforms 102, 202, and 204 can have two or more wavelengths amongst the waveforms. In some embodiments, the optical waveform 152 is modulated with a different modulation sequence than the optical waveforms 252 and/or 254. Similarly, the optical waveform 252, in an embodiment, is modulated with a different modulation sequence than the optical waveforms 152 and/or 254.

In addition to receiving the optical waveform 152, the solid state device 104 is configured, in an embodiment, to receive the optical waveforms 252 and 254. In some embodiments, the transmitter 102 is configured to focus the optical waveform 152 onto a first region of the solid state device 104. For example, the transmitter 102 can focus the optical waveform 152 onto a region of micromirrors (i.e., a plurality of micromirrors) located on the solid state device 104. Similarly, the transmitter 202 is, in an embodiment, configured to focus the optical waveform 252 onto a second region of the solid state device 104, and the transmitter 204 is configured to focus the optical waveform 254 onto a third region of the solid state device 104. In some embodiments, the first, second, and third regions of the solid state device 104 are discontinuous (i.e., they do not overlap). For example, the transmitter 102 can focus the optical wave 152 onto a plurality of micromirrors, and the transmitter 202 can focus the optical wave 252 onto a plurality of micromirrors that does not include any micromirrors that receives the optical waveform 152.

The solid state device 104 is, as discussed above, configured to steer the optical waveform 152 to target object 106. Additionally, the solid state device 104, in an embodiment, is configured to steer optical waveform 252 to target object 206 and optical waveform 254 to target object 208. In some embodiments, the solid state device 104 is configured such that the first region that receives the optical waveform 152 steers the optical waveform 152 toward the target object 106; the second region that receives the optical waveform 252 steers the optical waveform 252 toward the target object 206; and the third region that receives the optical waveform 254 steers the optical waveform 254 toward the target object 208. For example, the controller 112 can configure micromirrors on the solid state device 104 such that the micromirrors in the first region are positioned to steer the optical waveform 152 toward the target object 106; micromirrors in the second region are positioned to steer the optical waveform 252 toward the target object 206; and micromirrors in the third region are positioned to steer the optical waveform 254 toward the target object 208. In this way, a single solid state device may steer multiple optical waveforms to scan multiple different regions in the FOV simultaneously, thus increasing the scan rate of the system 100. While the above examples assume that the solid state device 104 is a micromirror device, other solid state devices (e.g., a phased array device), would work similarly to steer multiple optical waveforms toward multiple regions of interest in the FOV of the system 100. Additionally, in some embodiments, the optical waveforms 152, 252, and 254 may be steered and reflected off of the same target object.

The receiver 110 is, in an embodiment, configured to receive each of the optical waveforms 152, 252, and 254 after the waveforms have reflected off their respective target objects. For example, as discussed above, the receiver 110 is configured to receive reflected optical waveform 152 after being reflected off target object 106. Similarly, the receiver 110 is configured to receive the reflected optical waveform 252 after being reflected off target object 206 and the reflected optical waveform 254 after being reflected off target object 208. In some embodiments, each reflected optical waveform 152, 252, and 254 is received by its own receiver. After the receiver 110 receives each reflected optical waveform 152, 252, and 254, in an embodiment, the receiver 110 is configured to determine the distance to each of the target objects 106, 206, and 208 based on TOF as discussed above. Because, as discussed above the optical waveforms 152, 252, and 254, and thus, the reflected optical waveforms are, in an embodiment, orthogonal to one another (i.e., have a different modulation sequence and/or a different wavelength from one another), the receiver 110 can distinguish the different received signals from one another. Thus, the receiver 110 is capable of determining the distance to target object 106, target object 206, and target object 208 even when the transmitters 102, 202, and 204 transmit optical waveforms 152, 252, and 254 and/or the receiver receives the reflected optical waveforms 152, 252, and 254 simultaneously.

Figure 3:
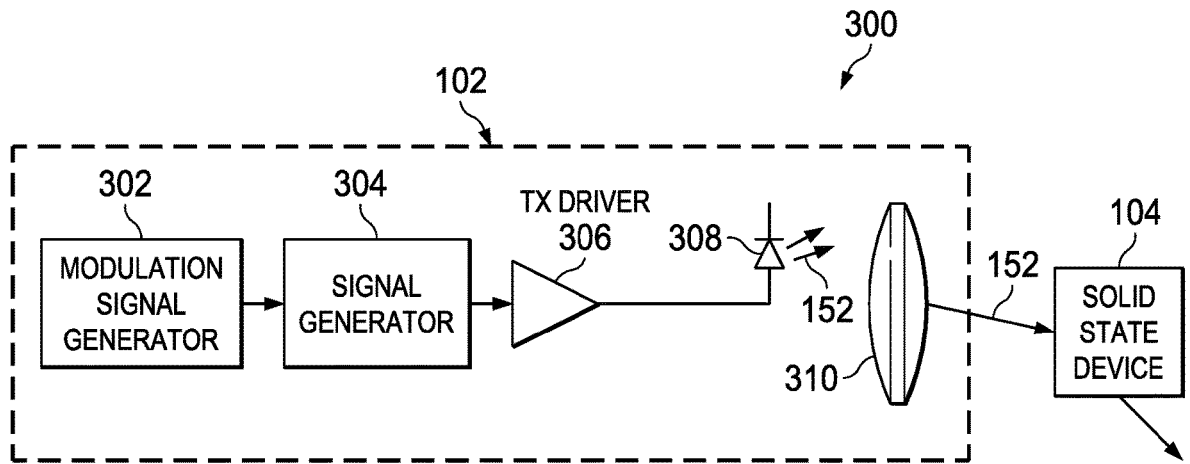
FIG. 3 shows an illustrative transmitting system for a distance measuring system in accordance with various examples.

FIG. 3 shows an illustrative transmitting system 300 for distance measuring system 100 in accordance with various examples. The transmitting system 300 includes transmitter 102 and solid state device 104. The transmitter 102, in an embodiment, includes a modulation signal generator 302, a signal generator 304, a transmission driver 306, a laser diode 308, and a set of optics 310. The modulation signal generator 302 is configured to provide a phase, frequency, amplitude, and/or position modulation reference signal. The signal generator 304 is configured to generate pulse sequences using the reference signal from the modulation signal generator 302. For example, the modulation signal generator 302, in an embodiment, is configured to generate a single tone signal. In some embodiments, the modulation signal generator 302 is configured to generate a single tone (i.e. continuous wave), a single tone with phase modulation (e.g. phase shift keying), a single tone with amplitude modulation (e.g. amplitude shift keying), multiple tones with fixed frequencies (e.g. frequency shift keying), a signal with frequency modulation over a narrowband frequency range (e.g. a chirp), and/or a signal with narrowband, pulse position modulation. The transmit driver 306 generates a driving signal to drive an optical transmitter such as laser diode 308. In other words, the modulation signal modulates the intensity of the light transmitted by laser diode 308 during the pulse. The signal generator 304 serves as a pulse sequence generator using the modulation signal as a reference. The set of optics 310 is configured to direct (e.g., focus) the optical waveform 152 (e.g., the modulated light signal) toward the solid state device 104. As discussed above, the solid state device 104 is configured to steer the optical waveform 152 toward a region of interest that includes target object 106. Each of the transmitters 202 and 204, in an embodiment, generates and directs its respective optical waveform (i.e., optical waveforms 252 and 254) in a similar manner as transmitter 102. In some embodiments, a single integrated circuit (e.g., modulation signal generator 302, signal generator 304, and transmission driver 206) drives multiple laser diodes to transmit the optical waveforms 152, 252, and 254 as discussed above.

Figure 4:
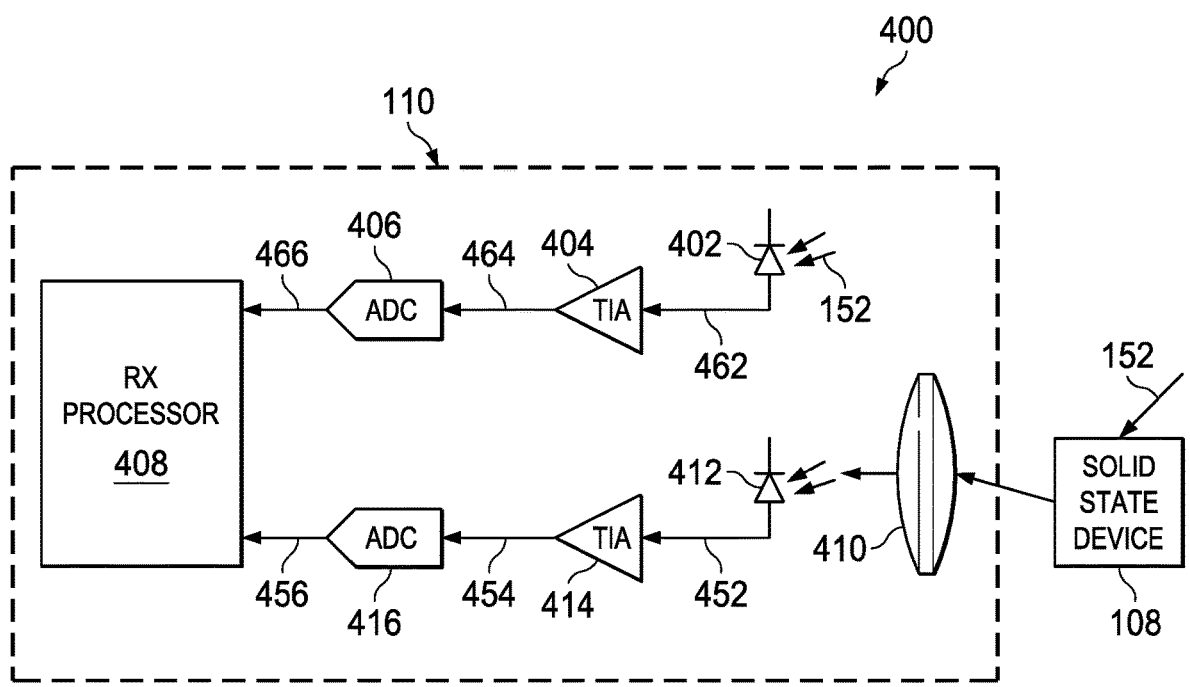
FIG. 4 show an illustrative receiving system for a distance measuring system in accordance with various examples.

FIG. 4 show an illustrative receiving system 400 for distance measuring system 100 in accordance with various examples. The receiving system includes the receiver 110 and the solid state device 108. The receiver includes, in an embodiment, a set of optics 410, two photodiodes 402 and 412, two trans-impedance amplifiers (TIAs) 404 and 414, two analog-to-digital converters (ADCs) 406 and 416, and a receiver processor 408. As discussed above, in an embodiment, the reflected optical waveform 152 is received by the solid state device 108 and steered toward the receiver 110. The set of optics 410, in an embodiment, receives the reflected optical waveform 152 from the solid state device 108. In other words, the solid state device 108 steers the reflected optical waveform 152 toward the set of optics 410. The set of optics 410 directs (e.g., focuses) the reflected optical waveform toward the photodiode 412. The photodiode 412 is configured to receive the reflected optical waveform 152 and convert the reflected optical waveform 152 into current received signal 452 (a current that is proportional to the intensity of the received reflected light). TIA 414 is configured to receive current received signal 452 and convert the current received signal 452 into a voltage signal, designated as voltage received signal 454, that corresponds with the current received signal 452. ADC 416 is configured to receive the voltage received signal 454 and convert the voltage received signal 454 from an analog signal into a corresponding digital signal, designated as digital received signal 456. Additionally, in some embodiments, the current received signal 452 is filtered (e.g., band pass filtered) prior to being received by the TIA 414 and/or the voltage received signal 454 is filtered prior to being received by the ADC 416. In some embodiments, the photodiode 412 also receives the reflected optical waveforms 252 and 254 and the receiver 110 converts those waveforms into digital received signals in a similar manner as reflected optical waveform 152 is converted into digital received signal 456.

Photodiode 402, in an embodiment, receives the optical waveform 152, or a portion of the optical waveform 152, directly from the transmitter 102 and converts the optical waveform 152 into current reference signal 462 (a current that is proportional to the intensity of the received light directly from transmitter 102). TIA 404 is configured to receive current reference signal 462 and convert the current reference signal 462 into a voltage signal, designated as voltage reference signal 464, that corresponds with the current reference signal 462. ADC 406 is configured to receive the voltage reference signal 464 and convert the voltage reference signal 464 from an analog signal into a corresponding digital signal, designated as digital reference signal 466. Additionally, in some embodiments, the current reference signal 462 is filtered (e.g., band pass filtered) prior to being received by the TIA 404 and/or the voltage reference signal 464 is filtered prior to being received by the ADC 406. In some embodiments, the photodiode 402 also receives the optical waveforms 252 and 254 directly from transmitters 202 and 204, respectively, and the receiver 110 converts those waveforms into digital reference signals in a similar manner as optical waveform 152 is converted into digital reference signal 466.

The processor 408 is any type of processor, controller, microcontroller, and/or microprocessor with an architecture optimized for processing the digital received signal 456 and/or the digital reference signal 466. For example, the processor 408 may be a digital signal processor (DSP), a central processing unit (CPU), a reduced instruction set computing (RISC) core such as an advanced RISC machine (ARM) core, a mixed signal processor (MSP), etc. The processor 408, in an embodiment, acts to demodulate the digital received signal 456 and the digital reference signal 466. In some embodiments, the processor 408 also acts to demodulate the digital received signals corresponding to the reflected optical waveforms 252 and 254 and the digital reference signals corresponding to the optical waveforms 252 and 254 received directly from transmitters 202 and 204. Because the modulation sequence and/or the wavelengths for the optical waveforms 152, 252, and/or 254 is different from one another, the processor 408, because it knows the modulation sequence and/or wavelength for each of the optical waveforms 152, 252, and/or 254, is capable of determining which signal is being processed/analyzed.

The processor 408 then determines, in an embodiment, the distance to one or more of the target objects 106, 206, and/or 208 by, as discussed above, performing a correlation function using the reference signal and the received signal. A peak in the correlation function corresponds to the time delay of the received reflected optical waveform 152, 252, and/or 254 (i.e., the TOF). The distance to the target objects can be estimated using the formula discussed above. In other embodiments, an FFT is performed on the received digital signal 456 and/or the received digital signals corresponding with the reflected optical waveforms 252 and/or 254. A phase of the tone then is used to estimate the delay (i.e., TOF) in the received signals. The distance then can be estimated using the formula discussed above.

Because the distance measuring system 100 utilizes a solid state device for beam steering, power requirements are reduced when compared to the conventional system because the power needed by the solid state device to steer optical waveforms to scan an FOV is much less than the power required in a motorized conventional system. Furthermore, because the signals are, in an embodiment, modulated signals, scan rate and robustness can be increased because multiple laser diodes with their own modulation pattern and/or wavelengths may transmit and scan different areas of the FOV simultaneously in the same environment without interference with one another.

Figure 5:
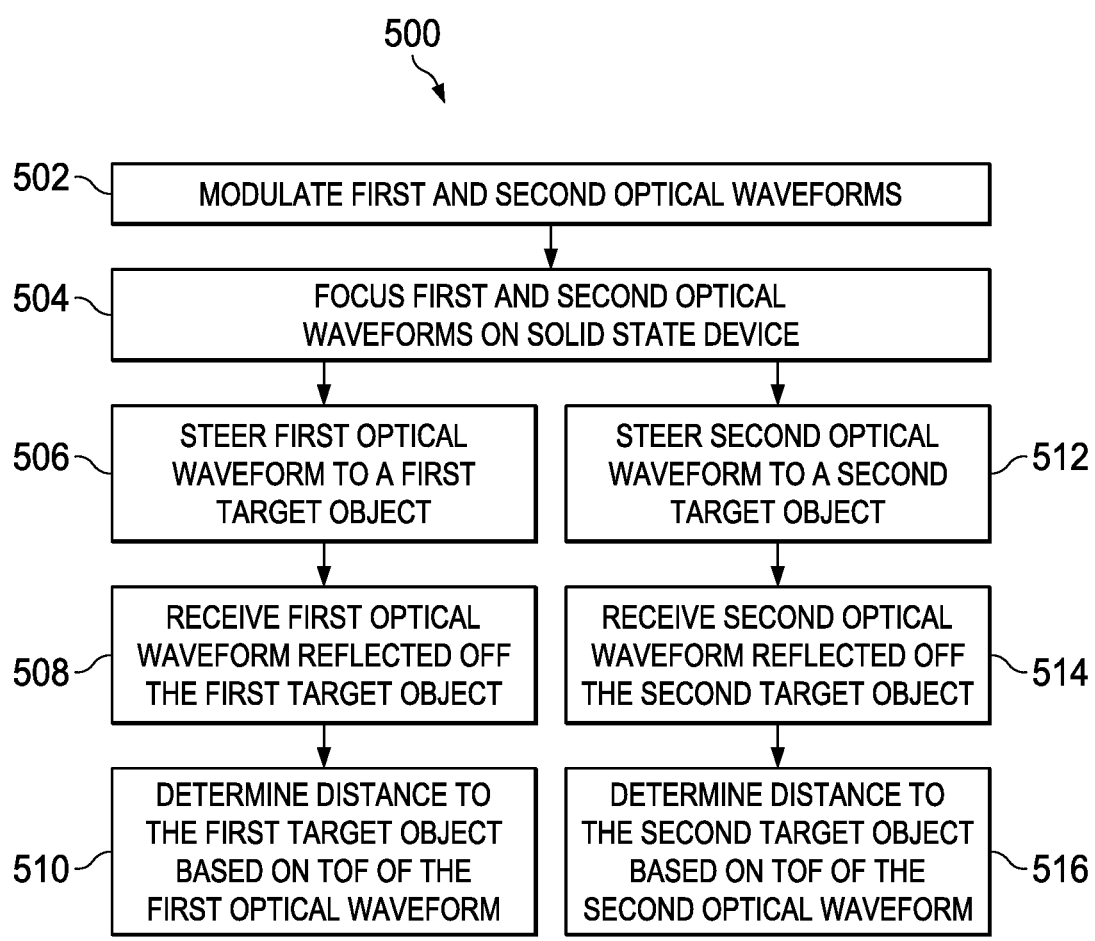
FIG. 5 shows an illustrative flow diagram of a method for determining a distance to a target object in accordance with various examples.

FIG. 5 shows an illustrative flow diagram of a method 500 for determining a distance to a target object in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 500, as well as other operations described herein, is performed by the transmitter 102 (including the modulation signal generator 302, signal generator 304, transmission driver 306, laser diode 308, and/or the set of optics 310), the transmitters 202 and/or 204, the solid state devices 104 and/or 108, and/or the receiver 110 (including the set of optics 410, photodiodes 402 and/or 412, TIAs 404 and/or 414, ADCs 406 and/or 416, and/or processor 408) and implemented in logic and/or by a processor executing instructions stored in a non-transitory computer readable storage medium.

The method 500 begins in block 502 with modulating and/or generating a first optical waveform and, in some embodiments, a second optical waveform. For example, the transmitter 102 generates optical waveform 152 that is modulated with a specific modulation sequence and/or a specific wavelength. The transmitter 202, in an embodiment, generates optical waveform 252 that is modulated with a specific modulation sequence that is different from the modulation sequence for optical waveform 152 and/or a specific wavelength that is different from the wavelength of optical waveform 152.

In block 504, the method 500 continues with focusing the first optical waveform, and in some embodiments, the second optical waveform on a solid state device. For example, the set of optics 310 is configured to focus the optical waveform 152 onto the solid state device 104. A set of optics in transmitter 202 is configured to focus the optical waveform 252 onto the solid state device 104 as well, in some embodiments, simultaneously as the optical waveform 152 is focused onto the solid state device 104. In some embodiments, the optical waveform 152 is focused on a first region of the solid state device 104 while the optical waveform 252 is focused on a second region of the solid state device 104 that is discontinuous with the first region.

The method 500 continues in block 506 with steering the first optical waveform to a first target object. For example, the solid state device 104 steers the optical waveform 152 to the target object 106. In block 508, the method 500 continues with receiving the first optical waveform reflected off the first target object. For example, the receiver 110 receives the reflected optical waveform 152 after being reflected off target object 106. In some embodiments, the solid state device 104 and/or 108 steers the reflected optical waveform 152 to the receiver 110. The method 500 continues in block 510 with determining the distance to the first target object based on the TOF of the first optical waveform. For example, the receiver 110 converts the reflected optical waveform 152 into a received electrical signal, such as received digital signal 456, and determines the TOF of the reflected optical waveform 152 based on a comparison between a reference signal corresponding to the optical waveform 152 received directly from the transmitter 102 with the received electrical signal. The distance then is determined based on the TOF.

The method 500 continues in block 512 with steering the second optical waveform to a second target object. For example, the solid state device 104 steers the optical waveform 252 to the target object 206. In block 514, the method 500 continues with receiving the second optical waveform reflected off the second target object. For example, the receiver 110 receives the reflected optical waveform 252 after being reflected off target object 206. In some embodiments, the solid state device 104 and/or 108 steers the reflected optical waveform 252 to the receiver 110. The method 500 continues in block 516 with determining the distance to the second target object based on the TOF of the second optical waveform. For example, the receiver 110 converts the reflected optical waveform 252 into a received electrical signal and determines the TOF of the reflected optical waveform 252 based on a comparison between a reference signal corresponding to the optical waveform 252 received directly from the transmitter 202 with the received electrical signal corresponding to the reflected optical waveform 252. The distance then is determined based on the TOF.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
 a first transmitter configured to produce a first optical waveform;
 a second transmitter configured to produce a second optical waveform;
 a solid state device optically coupled to the first transmitter and to the second transmitter, the solid state device comprising first elements in a first solid state device region and second elements in a second solid state device region, the solid state device configured to:
  steer, by the first elements, the first optical waveform toward a first region; and
  steer, by the second elements, the second optical waveform towards a second region; and
 a receiver configured to:
  receive a first reflection of the first optical waveform;
  receive a second reflection of the second optical waveform;
  determine a first distance based on the first reflection of the first optical waveform; and
  determine a second distance based on the second reflection of the second optical waveform.

2. The system of claim 1, wherein the receiver is configured to receive the first reflection of the first optical waveform simultaneously with receiving the second reflection of the second optical waveform.

3. The system of claim 1, wherein:
 the first transmitter includes:
  a first signal generator configured to produce a first pulse sequence corresponding with the first optical waveform; and a first laser diode configured to produce the first optical waveform; and the second transmitter includes:
a second signal generator configured to generate a second pulse sequence corresponding with the second optical waveform; and
a second laser diode configured to produce the second optical waveform.

4. The system of claim 3, wherein the first pulse sequence and the first optical waveform have a first wavelength and the second pulse sequence and the second optical waveform have a second wavelength, the first wavelength being different from the second wavelength.

5. The system of claim 3, wherein the first pulse sequence and the first optical waveform are modulated with a first modulation sequence and the second pulse sequence and the second optical waveform are modulated with a second modulation sequence, the first modulation sequence being different from the second modulation sequence.

6. The system of claim 3, wherein:
the first transmitter further includes first optics configured to focus the first optical waveform from the first laser diode onto the first solid state device region;
the second transmitter further includes second optics configured to focus the second optical waveform from the second laser diode onto the second solid state device region; and
the first solid state device region being discontinuous with the second solid state device region.

7. The system of claim 1, wherein the solid state device is further configured to:
receive the first reflection of the first optical waveform; and
steer the first reflection of the first optical waveform toward the receiver.

8. The system of claim 1, wherein the solid state device is a first solid state device, the system further comprising a second solid state device configured to:
receive the first reflection of the first optical waveform; and
steer the first reflection of the first optical waveform toward the receiver.

9. The system of claim 1, wherein the first optical waveform has a single tone, a single tone with phase modulation, multiple tones with fixed frequencies, a signal with frequency modulation over a frequency range, or a signal with narrowband pulse position modulation.

10. The system of claim 1, further comprising:
a third transmitter optically coupled to the solid state device, the third transmitter configured to produce a third optical waveform;
wherein the solid state device is further configured to:
receive, by third elements in a third solid state device region, the third optical waveform; and
steer the third optical waveform toward a third region; and
wherein the receiver is further configured to:
receive a third reflection of the third optical waveform in the third region; and
determine a third distance based on the third reflection of the third optical waveform.

11. The system of claim 1, wherein the solid state device is a digital micromirror device.

12. A system, comprising:
a first light source configured to produce a first optical waveform responsive to a first pulse sequence;
a second light source configured to produce a second optical waveform responsive to a second pulse sequence; and
a solid state device optically coupled to the first light source and to the second light source, the solid state device comprising first elements in a first solid state device region and second elements in a second solid state device region, the solid state device configured to:
steer, by the first elements, the first optical waveform toward a first region; and
steer, by the second elements, the second optical waveform toward a second region.

13. The system of claim 12, further comprising optics configured to focus the first optical waveform from the first light source onto the first solid state device region.

14. The system of claim 13, wherein the first solid state device region is discontinuous from the second solid state device region.

15. The system of claim 12, wherein the first optical waveform has a first wavelength and the second optical waveform has a second wavelength, the first wavelength being different from the second wavelength.

16. The system of claim 12, wherein the first optical waveform is modulated with a first modulation sequence and the second optical waveform is modulated with a second modulation sequence, the first modulation sequence being different from the second modulation sequence.

17. The system of claim 12, further comprising:
a first signal generator configured to produce the first pulse sequence; and
a second signal generator configured to produce the second pulse sequence.

18. The system of claim 12, wherein the solid state device is a digital micromirror device.

19. A method comprising:
producing, by a transmitter, a first optical waveform;
steering, by first elements in a first solid state device region of a solid state device, the first optical waveform to a first region;
producing, by the transmitter, a second optical waveform; and
steering, by second elements in a second solid state device region of the solid state device, the second optical waveform to a second region.

20. The method of claim 19, wherein the first optical waveform has a first wavelength, the second optical waveform has a second wavelength, and the first wavelength is different from the second wavelength.

21. The method of claim 19, further comprising:
modulating the first optical waveform with a first modulation sequence; and
modulating the second optical waveform with a second modulation sequence;
wherein the first modulation sequence is different from the second modulation sequence.

22. The method of claim 19, further comprising:
receiving, by a receiver, a first reflection of the first optical waveform;
receiving, by the receiver, a second reflection of the second optical waveform;
determining, by the receiver, a first distance based on the first reflection of the first optical waveform; and
determining, by the receiver, a second distance based on the second reflection of the second optical waveform.

* * * * *